W. A. HATCHER.
ROTARY PUMP.
APPLICATION FILED JUNE 15, 1912.

1,065,244. Patented June 17, 1913.
3 SHEETS—SHEET 1.

Witnesses
Harold V. Van Antwerp
Anna De Windt

Inventor
William A. Hatcher
By Luther V. Moulton
Attorney

W. A. HATCHER.
ROTARY PUMP.
APPLICATION FILED JUNE 15, 1912.

1,065,244.

Patented June 17, 1913.

3 SHEETS—SHEET 2.

Witnesses

Inventor
William A. Hatcher
By Luther V. Moulton
Attorney

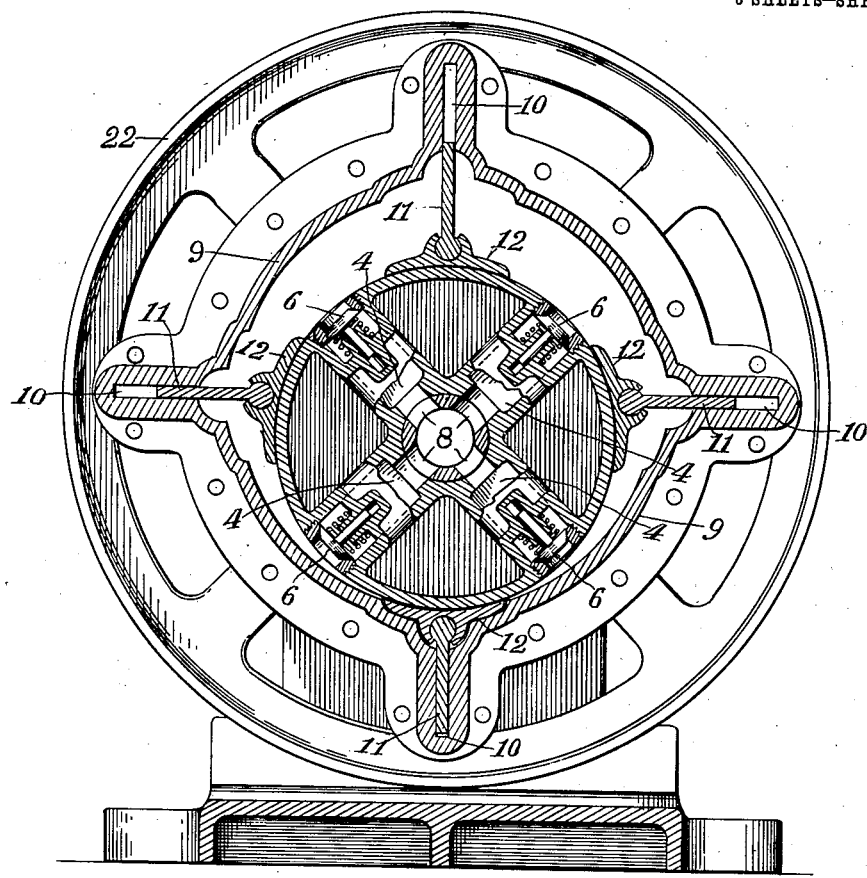

UNITED STATES PATENT OFFICE.

WILLIAM A. HATCHER, OF GRAND RAPIDS, MICHIGAN.

ROTARY PUMP.

1,065,244.  Specification of Letters Patent.  Patented June 17, 1913.

Application filed June 15, 1912. Serial No. 703,943.

*To all whom it may concern:*

Be it known that I, WILLIAM A. HATCHER, a citizen of the United States of America, residing at Grand Rapids, in the county of Kent and State of Michigan, have invented certain new and useful Improvements in Rotary Pumps; and I do hereby declare the following to be a full, clear, and exact description of the invention, such as will enable others skilled in the art to which it appertains to make and use the same.

My invention relates to improvements in rotary pumps, and its object is to provide the same with various new and useful features hereinafter more fully described and particularly pointed out in the claims.

Figure 1:
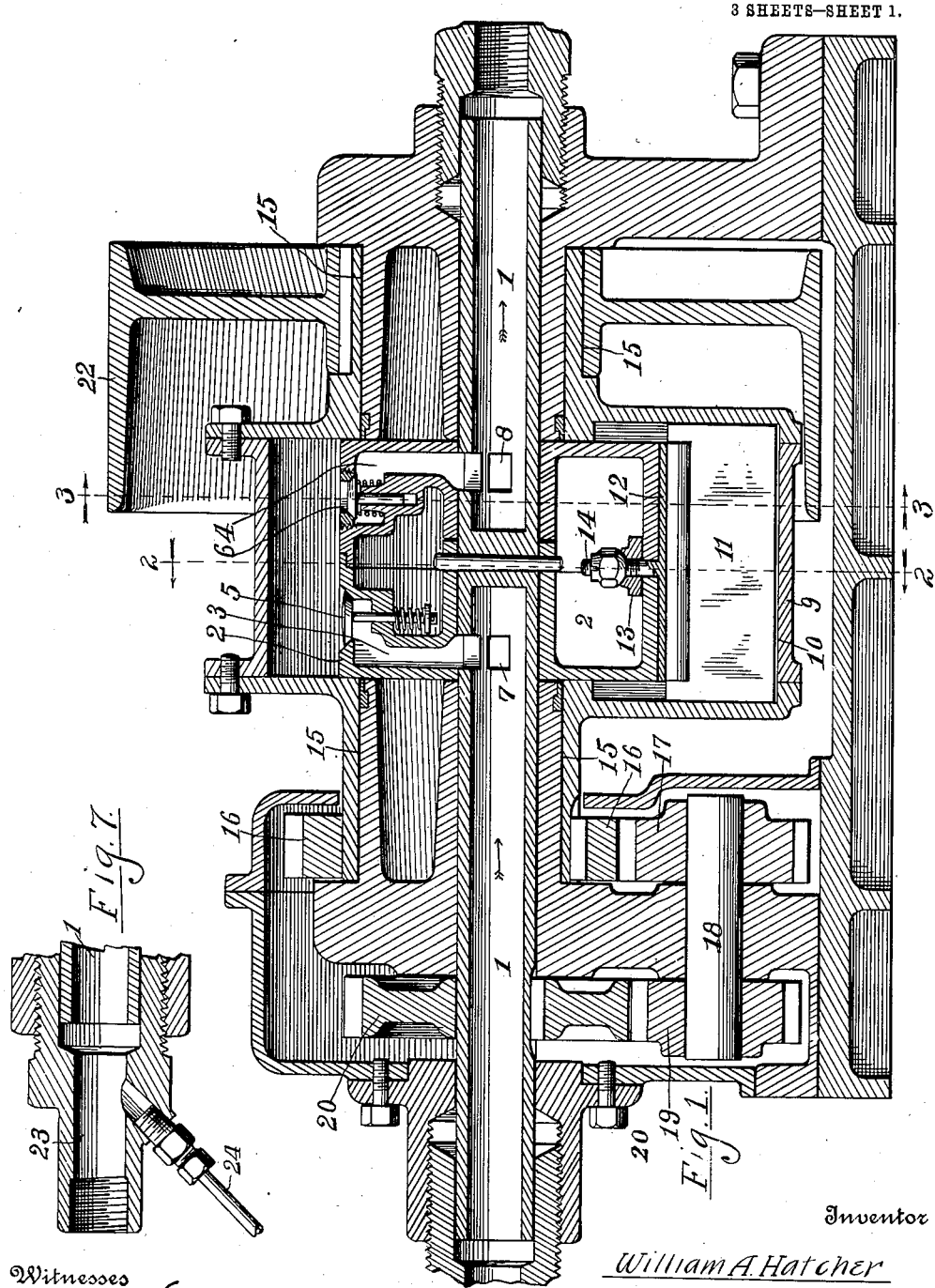
Figure 2:
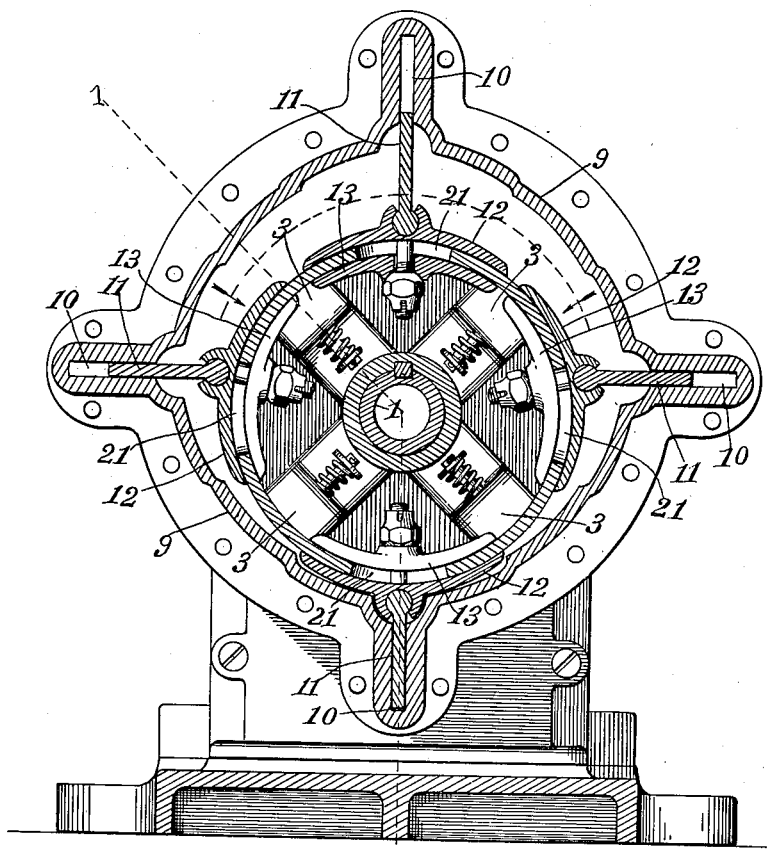
Figure 6:
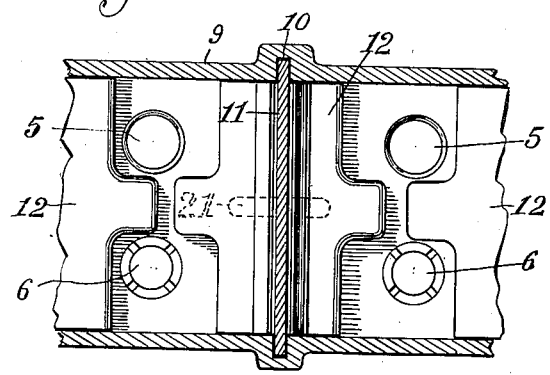

My invention consists essentially of an inner rotative member or piston mounted on a rotative shaft, said shaft and piston having passages therethrough; check valves to control the flow of fluid through said passages; a rotating case independently journaled eccentric to the shaft; gearing connecting the case and shaft whereby the piston and case are simultaneously rotated in the same direction and at the same angular velocity; radial ways in the case; radially slidable vanes in the ways and connected to segments slidable on the piston and pivotally connected to the inner edges of the vanes, and in various features of combination and arrangement as hereinafter more fully described and particularly pointed out in the claims, reference being had to the accompanying drawings, in which:

Figure 1 is a longitudinal section of a device embodying my invention taken on the line 1—1 of Fig. 2; Fig. 2 a tranverse vertical section of the same on the line 2—2 of Fig. 1; Fig. 3 the same on the line 3—3 of Fig. 1; Fig. 4 a perspective detail of the sliding segments; Fig. 5 the same of one of the sliding vanes; Fig. 6 a detail showing a portion of the surface of the piston with a portion of the case and one of the vanes shown in section; and Fig. 7 a detail of the receiving end of the shaft and the pipe couplings shown in vertical section.

Like numbers refer to like parts in all of the figures.

1 represents a tubular shaft journaled in a suitable frame and having a partition near the middle whereby the shaft is divided into inlet and outlet passages. Fixed on this shaft opposite the partition is a cylindrical piston having radial passages 3 communicating with ports 7 in the inlet part of the shaft and outlet passages 4 communicating with ports 8 in the outlet part of the shaft. The inlet passages are provided with check valves 5 to permit fluid to pass from the piston into the space between the piston and case, and the outlet passages 4 are provided with check valves 6 to permit the fluid to escape from between the piston and the case. I prefer to provide four inlet passages and four outlet passages, these passages preferably being in radial arms connecting the hub and periphery of the piston.

In the middle of the circumference of the piston are four circumferential slots 21 arranged equi-distant around the piston and these slots are closed by inner segments 13 and outer segments 12 opposite each other and slidable circumferentially on the shell of the piston and between the respective sets of arms. The outer segments extend across the face of the piston longitudinally and each pair of segments are connected by a stud 14 extending through the slot 21 and movable therein. The piston is inclosed in a case having eccentric hubs or bosses 15 journaled on the frame eccentric to the shaft and piston whereby the piston is close to the inside of the case at one point in its periphery and spaced apart therefrom throughout the remainder of the circumference. The interior of the case is of such form as to fit closely to the circumference of the piston and the outer segments thereon, but without contact therewith when close thereto. Pivotally connected to each outer segment 12 is a sliding vane 11 extending radially of the axis of the case and extending into suitable recesses or chambers 10 in the periphery of the case and projecting radially therefrom and also slidable in grooves in the heads of the case to form a tight joint and to guide the vanes, each vane thus is slidable in contact with the wall of a groove or chamber at three sides and the other side fits within a segment which contacts the surface of the piston, thus forming a tight joint on all sides of the vanes which will not become leaky when worn by use.

The frame is provided with suitable bearings for the case and shaft, the shaft bearings being within the case bearings and eccentric thereto, and the case bearings within the eccentric hubs or bosses of the case.

The device may be driven by any convenient means, a pulley 22 mounted on one of the hubs 15 being shown, and on the other hub is fixed a gear 16 engaging a pinion 17 on a countershaft 18. This counter shaft is connected to the shaft 1 by gears 19 and 20 and this train of gears are so proportioned that the shaft 1 is driven at the same angular velocity as the case thus relieving the vanes of any driving stress.

In operation, the case and piston being thus simultaneously rotated at the same angular velocity, move as though the piston were rolling close to the interior of the case at one stationary point in the interior of the same once at each revolution of the machine. The sliding vanes 11 reciprocate radially to accommodate this movement and the segments have a reciprocating sliding movement on the surface of the piston and a rocking movement on the inner edge of the vanes. There are thus formed segmental chambers between the vanes which chambers increase in capacity during somewhat more than one-half of the revolution and decrease in capacity during the remainder of the same, thus drawing in the fluid through the inlet valves and passages and discharging the same through the outlet valves and passages at each revolution. The radial direction of the inlet passages tends by centrifugal action to accelerate the flow into the device and thus increase the capacity when pumping air, gas or other elastic fluid.

Obviously the number of abutments may be reduced to two or increased to more than four, but I prefer four or more as being more satisfactory in operation and less likely to permit the fluid to slip, and for the further reason that when pumping fluid that has to be raised by suction each abutment is relieved from suction stress before the pressure on the discharge side begins and there is less back expansion after compression.

I also prefer to provide for a flow of oil or other suitable fluid through the machine to lubricate and pack the same if using the device for pumping air or gas. And for this purpose a pipe 24 is shown communicating with the inlet passage. If used for pumping oil, water or other inelastic fluid it is not so desirable, as such fluid will serve the purpose.

What I claim is:—

1. A rotary pump, comprising a rotative shaft, a cylindrical piston concentric with the shaft and fixed thereon the shaft and piston having inlet and outlet passages therethrough, check valves in the piston to control the flow of fluid through said passages, a case inclosing the piston and having bearings surrounding the shaft and eccentric thereto, radially sliding vanes extending between the piston and case, and gearing connecting the case and shaft and adapted to rotate the same at the same angular velocity.

2. A rotary pump, comprising a rotative shaft and a cylindrical piston fixed thereon, said shaft and piston having separate inlet and outlet passages therethrough, check valves to control the flow of fluid through said passages, a case inclosing said piston and arranged eccentric thereto, tubular bearings for the case surrounding the shaft, radially disposed chambers in the case, vanes slidable in the chambers, segments slidable on the surface of the piston and pivotally attached to the vanes and means for rotating the piston and case at the same angular velocity.

3. A rotary pump, comprising a shaft having axial inlet and outlet openings, a cylindrical piston fixed on the shaft and having radial inlet and outlet openings communicating with the respective openings in the shaft, check valves in the piston to control the flow of fluid through said openings, a rotative case inclosing the piston and arranged eccentric thereto, vanes slidable radially in the case and segments slidable circumferentially on the piston and pivotally attached to the inner edges of the vanes.

4. A rotary pump, comprising a rotative shaft, a cylindrical piston fixed on the shaft, separate inlet and outlet passages in the shaft and piston, check valves to control the flow of fluid through said passages, a case inclosing said piston and arranged eccentric thereto, radially movable vanes extending between the case and piston and a train of gears connecting the shaft and case to rotate the same at the same angular velocity.

5. A rotary pump, comprising a rotative shaft having an inlet passage in one end and an outlet passage in the other end, a cylindrical piston fixed on the shaft and having radial inlet passages near one end and radial outlet passages near the other end, said passages in the piston communicating with a like passage in the shaft, check valves in the piston to control the flow of fluid through the passages, a rotative case inclosing the piston and eccentric thereto, radial chambers in the case, vanes radially slidable in the chambers, circumferential slots in the middle of the piston, inner and outer segments slidable circumferentially on the shell of the piston, studs connecting the segments and slidable in the slots, the outer segment also being pivotally connected to the respective inner edges of the respective vanes.

6. A rotary pump, comprising a rotative case, a rotative cylindrical piston in the case and eccentric thereto, means for rotating the case and piston at the same angular velocity, said piston also having passages to admit fluid to the space between the piston and case and passages to discharge fluid from said space, check valves to control the flow of said fluid, radially disposed chambers in the case, radially slidable vanes in said chambers, and circumferentially slidable segments on said piston pivotally attached to the inner edges of the vanes.

7. A rotary pump, comprising a rotative piston, a rotative case inclosing the piston and arranged eccentric thereto, vanes radially slidable in the case, means for slidably connecting the inner ends of the vanes to the piston, means for admitting fluid to the space between the piston and case and for allowing the fluid to escape therefrom and means for positively rotating the piston and case at the same angular velocity.

In testimony whereof I affix my signature in presence of two witnesses.

WILLIAM A. HATCHER.

Witnesses:
HAROLD O. VAN ANTWERP,
LUTHER V. MOULTON.